United States Patent
Garcia Morchon et al.

(10) Patent No.: US 10,951,423 B2
(45) Date of Patent: Mar. 16, 2021

(54) SYSTEM AND METHOD FOR DISTRIBUTION OF IDENTITY BASED KEY MATERIAL AND CERTIFICATE

(71) Applicant: KONINKLIJKE PHILIPS N.V., Eindhoven (NL)

(72) Inventors: Oscar Garcia Morchon, Eindhoven (NL); Ronald Rietman, Eindhoven (NL); Ludovicus Marinus Gerardus Maria Tohluizen, Waalre (NL); Maarten Peter Bodlaender, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 183 days.

(21) Appl. No.: 16/087,828

(22) PCT Filed: Mar. 28, 2017

(86) PCT No.: PCT/EP2017/057298
§ 371 (c)(1),
(2) Date: Sep. 24, 2018

(87) PCT Pub. No.: WO2017/167741
PCT Pub. Date: Oct. 5, 2017

(65) Prior Publication Data
US 2019/0089546 A1   Mar. 21, 2019

(30) Foreign Application Priority Data
Mar. 29, 2016   (EP) ..................................... 16162597

(51) Int. Cl.
*H04L 29/06*   (2006.01)
*H04L 9/32*   (2006.01)
(Continued)

(52) U.S. Cl.
CPC ............ *H04L 9/3268* (2013.01); *H04L 9/083* (2013.01); *H04L 9/0825* (2013.01);
(Continued)

(58) Field of Classification Search
CPC ..... H04L 9/3268; H04L 9/0825; H04L 9/083; H04L 9/0847; H04L 9/0894; H04L 9/3073; H04L 9/3242; H04L 2209/805
See application file for complete search history.

(56) References Cited

U.S. PATENT DOCUMENTS 7,269,726 B1 *   9/2007   Corella .................. H04L 9/006
                                                    713/156
7,401,215 B2   7/2008   Montenegro et al.
(Continued)

FOREIGN PATENT DOCUMENTS

EP   1906587 A2   4/2008
JP   2001111539 A   4/2001
(Continued)

OTHER PUBLICATIONS

Luping Wang Xiao, Empirical security of the HIMMO scheme, Oct. 2015 (Year: 2015).*
(Continued)

*Primary Examiner* — Darshan I Dhruv

(57) ABSTRACT

A cryptographic system (100) is provided for distributing certificates comprising a certificate authority device (110) and multiple network nodes (140, 150, 160). A network node (140) sends a public key to the certificate authority device. The certificate authority device (110) generate a certificate comprising the public key, forms an identifier by applying an identity forming function to the certificate and generates local key material specific for the network node by applying a local key material generation algorithm of an identity based key pre-distribution scheme on the identifier, and
(Continued)

sends the local key material encrypted to the network node. The network node may be authenticated implicitly through its access to a shared key obtainable from the local key material.

15 Claims, 4 Drawing Sheets

(51) Int. Cl.
*H04L 9/08* (2006.01)
*H04L 9/30* (2006.01)

(52) U.S. Cl.
CPC .......... *H04L 9/0847* (2013.01); *H04L 9/0894* (2013.01); *H04L 9/3073* (2013.01); *H04L 9/3242* (2013.01); H04L 2209/805 (2013.01)

(56) References Cited

U.S. PATENT DOCUMENTS

| | | | |
|---|---|---|---|
| 7,657,739 B2 | 2/2010 | Nakano et al. | |
| 2004/0179682 A1* | 9/2004 | Soliman | H04L 9/0822 380/44 |
| 2006/0095771 A1 | 5/2006 | Appenzeller et al. | |
| 2006/0248334 A1* | 11/2006 | Ramzan | H04L 9/3218 713/156 |
| 2007/0083757 A1 | 4/2007 | Nakano et al. | |
| 2010/0082986 A1 | 4/2010 | Gentry | |
| 2010/0211779 A1* | 8/2010 | Sundaram | H04L 9/3073 713/168 |
| 2011/0026714 A1* | 2/2011 | Thomas | G06F 21/57 380/278 |
| 2011/0033054 A1* | 2/2011 | Garcia morchon | H04L 9/083 380/279 |
| 2011/0202755 A1* | 8/2011 | Orsini | G06F 21/602 713/151 |
| 2011/0206201 A1* | 8/2011 | Garcia Morchon | H04L 9/0838 380/44 |
| 2012/0170751 A1* | 7/2012 | Wurm | H04L 9/0897 380/278 |
| 2014/0244998 A1* | 8/2014 | Amenedo | H04L 63/126 713/156 |
| 2014/0331050 A1* | 11/2014 | Armstrong | H04L 9/0819 713/171 |
| 2014/0351589 A1* | 11/2014 | Chenna | H04L 9/3271 713/168 |
| 2015/0244712 A1* | 8/2015 | Iwanski | H04L 67/10 713/153 |
| 2016/0323264 A1* | 11/2016 | Nayshtut | H04L 63/0823 |
| 2017/0208062 A1* | 7/2017 | Morikawa | H04L 9/0877 |

FOREIGN PATENT DOCUMENTS

| | | | |
|---|---|---|---|
| JP | 2001350406 A | 12/2001 | |
| JP | 2006129143 A | 5/2006 | |
| WO | 2009128010 A1 | 10/2009 | |
| WO | 2009128011 A1 | 10/2009 | |
| WO | WO 2009/128010 | * 10/2009 | |
| WO | WO2009128010 | * 10/2009 | ............... H04L 9/32 |
| WO | 2016034453 A1 | 3/2016 | |
| WO | 2017103226 A1 | 6/2017 | |
| WO | 2017167771 A1 | 10/2017 | |

OTHER PUBLICATIONS

Luping Wand Xiao, Empirical security of the HIMMO scheme, Oct. 2015, (Year: 2015).*

Garcia-Morchon et al: "HIMMO—A Lightweight Collusion-Resistant Key Predistribution Scheme"; Published in CryptologyePrint Archive, Report 2014/698, 28 Page Document.

* cited by examiner

SYSTEM AND METHOD FOR DISTRIBUTION OF IDENTITY BASED KEY MATERIAL AND CERTIFICATE

CROSS-REFERENCE TO PRIOR APPLICATIONS

This application is the U.S. National Phase application under 35 U.S.C. § 371 of International Application No. PCT/EP2017/057298, filed on Mar. 28, 2017, which claims the benefit of European Patent Application No. 16162597.5, filed on Mar. 29, 2016. These applications are hereby incorporated by reference herein.

FIELD OF THE INVENTION

The invention relates to a cryptographic system, a network node, a certificate authority device, a network node method, a certificate authority method, a computer program and a computer readable medium.

BACKGROUND OF THE INVENTION

In many current cryptographic infrastructures use is made of so-called certificates. One popular certificate system employs X.509 certificates as described in RFC 5280. In the X.509 system, a certificate contains a public key and information on the owner of the public key. The owner of the public also has the corresponding private key. The public and private key together form a key-pair for use in an asymmetric cryptographic scheme, e.g., encryption or signing, etc.

In X.509 a certificate authority signs the certificate. When later the certificate is used, the signature can be verified. A verification of the signature proves that the certificate authority certified the combination of public key and the other information.

Certificates have become ubiquitous in some types of secure communications. For example, X.509 certificate are used in the https protocol against hijacking of a website. Unfortunately, certificates also have a number of drawbacks that make them less suitable for some applications.

Signed certificate can be quite large. For example, a typical X.509 certificate using 1024 bit RSA keys may be about 1 kilobyte. The size of a certificate for 2048 bit keys would be considerably larger still. This makes certificates less suitable for networks in which communication overhead must be small. For example, in internet-of-things, sensor networks, etc, communication overhead is preferably minimized. Furthermore, using certificates requires quite substantial computation capabilities, not only during set-up of the certificate but during regular use, as the signature on received certificates must be verified. Asymmetric cryptography, such as RSA and the like, typically require large-number computations which may take too long for regular communication on low-resource devices.

There is thus a desire to address these problems, and other problems as set out herein.

SUMMARY OF THE INVENTION

It would be advantageous to have an improved way to distribute and verify certificates. A cryptographic system is provided as described in the claims in which certificates need not be signed to be verifiable. Apart from a certificate, a network node receives local key material specific for the network node, which was generated by applying a local key material generation algorithm of the identity-based key pre-distribution scheme on the root key material and the identifier. As described herein, identity-based key pre-distribution schemes allow key agreement of shared keys based on an identity of the user. The identity is obtained from the certificate.

Implicit certification and verification are thus achieved since the parameters that a network node A wishes to be verified by network node B are embedded in A's identifier. For instance, A's identifier might be computed as the hash function of the certificate.

Even if the certificate is not explicitly signed, a network node proves its authenticity by being able to participate in communication which uses the shared key. Thus, authentication is done through an active exchange of messages between two nodes, rather than in a passive verification of a signature. Although authentication involves a protocol between two parties, the advantage of not having to include a signature on the certificate reduces overhead. Moreover, in many applications the network will engage in network communication anyway, with which the authentication may be combined.

In an embodiment, a network node receives local key material from multiple certificate authorities. This local key material may be combined by the network node. Thus if a certificate authority device is hacked the local key material of a network node is not directly compromised.

The network node and certificate authorities are electronic devices. For example, the network node may be a sensor, or a mobile electronic device, e.g., mobile phone, set-top box, smart-card, computer, etc. The certificate authority device may be a computer, server, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1A schematically shows an example of an embodiment of a cryptographic system 100, FIG. 1B schematically shows an example of an embodiment of a cryptographic system 101, FIG. 2 schematically shows an example of an embodiment of distributing a certificate, FIGS. 3A and 3b schematically show an example of an embodiment of using a certificate, FIG. 4A schematically shows a computer readable medium having a writable part comprising a computer program according to an embodiment, FIG. 4B schematically shows a representation of a processor system according to an embodiment.

DETAILED DESCRIPTION OF PREFERRED EMBODIMENTS

Figure 1A:
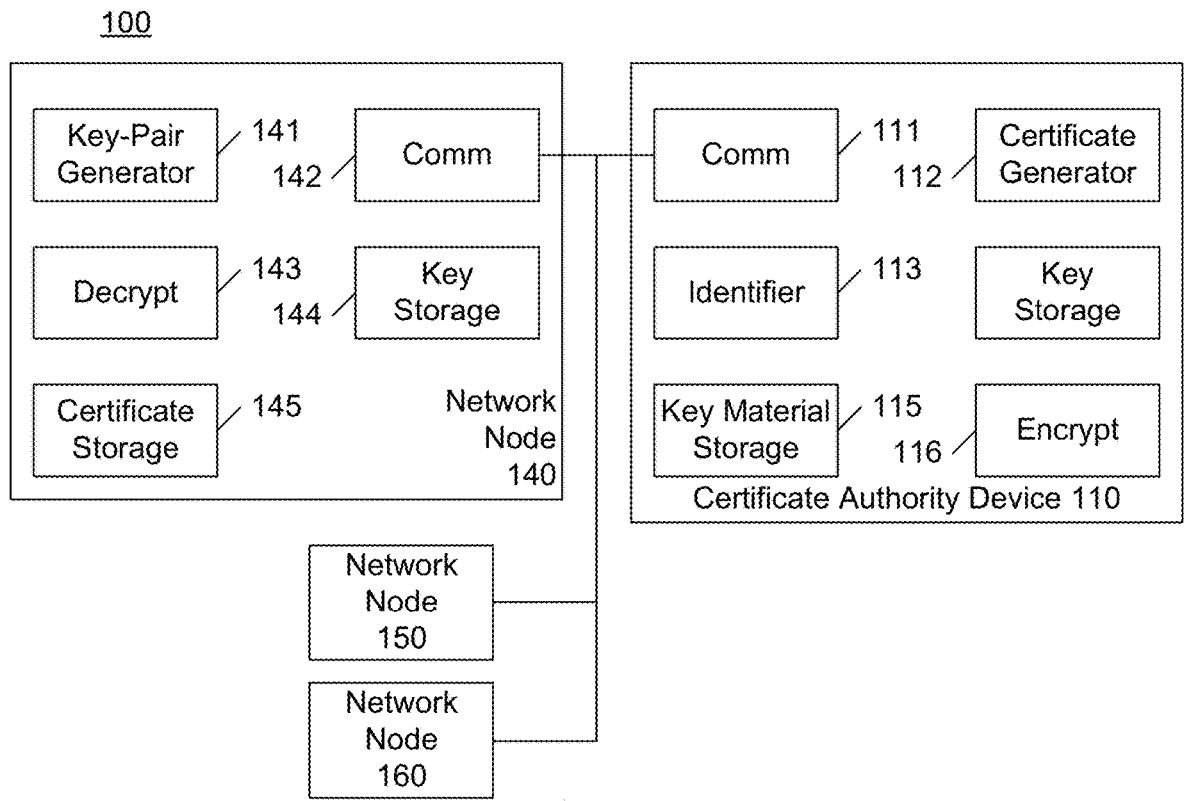

While this invention is susceptible of embodiment in many forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them. Further, the invention is not limited to the embodiments, and the invention lies in each and every novel feature or combination of features described herein or recited in mutually different dependent claims.

The current public key infrastructure relies on a certification authority that issues certificates. When two network nodes wish to communicate, e.g., a client and a server, e.g., two sensor nodes, etc, they exchange their certificates containing their public-keys. In this way, they can mutually verify the public-keys and agree on a shared key using their public and private keys. The shared key, e.g., a common secret accessible by the two network nodes, may be used to encrypt and authenticate messages sent between the client and server in the future.

Due to resource constraints, however, achieving key agreement, e.g., in wireless sensor networks, is non-trivial. For example, public-key based schemes, may not be suitable, e.g., for wireless sensor networks due to the limited computational abilities of the sensor nodes.

So-called identity based key pre-distribution schemes provide a possible way to simplify the key agreement. An identity-based key pre-distribution scheme has two phases: key pre-distribution, and key derivation. Associated with the two phases of the identity-based key pre-distribution scheme are two algorithms: a local key material generation algorithm and a key establishment algorithm, respectively.

The identity-based key pre-distribution scheme is set up by providing a trusted third party, e.g., a certificate authority, with root key material. During key pre-distribution local key material is generated for each network node and stored on the network node, by applying the local key material generation algorithm on the root key material and an identifier of each network node. During the key derivation phase, two network nodes can derive a shared key by applying the key establishment algorithm on their local key material and the identifier of the other network node. For example, a first network node may apply the key establishment algorithm on the second identifier of the second network node and its own first local key material, while the second network node may apply the key establishment algorithm on the first identifier of the first network node and its second local key material. The result of the key establishment algorithm is an identity-based key shared between two network nodes.

There exist a number of identity-based key pre-distribution schemes. For example, an identity based key pre-distribution scheme is described in "HIMMO—A lightweight collusion-resistant key predistribution scheme", by Oscar Garcia-Morchon, Domingo Gomez-Perez, Jaime Gutierrez, Ronald Rietman, Berry Schoenmakers and Ludo Tolhuizen. Published in Cryptology ePrint Archive, Report 2014/698. An improved version of HIMMO is described in European patent application "Improved system for key sharing" filed with the EPO at 17.12.2015 and with filing number EP15200857.9, of the same applicant, and incorporated by reference. HIMMO, like some other identity based key-distribution schemes, has the disadvantage that sometimes key agreement may fail, or that additional key-reconciliation data (also referred to as helper data) is needed to arrive at a shared key. The key-reconciliation data is usually generated by the first network node that has access to both identities, e.g., the second network node, if the first network note initiated the key agreement.

HIMMO is an identity-based key pre-distribution scheme based on the Hiding Information (HI) and Mixing Modular Operations (MMO) problem. HIMMO is lightweight and more quantum-safe since all existing attacks rely on lattices. In HIMMO, the TTP has some secret root keying material, e.g. a bivariate function $R(x,y)$. The TTP can extract a secret function $G\_A(x)$ for a node A from its root keying material ($G\_A(x)=R(A,y)$ where this operation is done as described in HIMMO). When A and B wish to establish a common key, A evaluates $G\_A(x=B)$ and B evaluates $G\_B(x=A)$.

Another usable identity based key pre-distribution scheme is described in "Perfectly-Secure Key Distribution for Dynamic Conferences" by Carlo Blundo, et al. This scheme has the advantage that key agreement cannot fail, and that no key-reconciliation data is needed. On the other hand the scheme of Blundo is much less resilient against collusion attacks. Yet a further identity based key-distribution schemes are the Sakai-Ohgishi-Kasahara identity-based non-interactive key exchange (ID-NIKE) schemes.

In an embodiment the root key material comprises a bivariate polynomial and the local key material comprises a univariate polynomial. For example, in the Blundo identity based key pre-distribution scheme the root key material is formed by a bivariate polynomial $f(x,y)$. Local key material g for and a first network node with identifier $ID_1$, is formed by collapsing the bivariate to a univariate polynomial $g(y)=f(ID_1,y)$. A node with local key material g and the identifier of a second network node $ID_2$ obtains a shared key by computing $g(ID_2)$. All polynomial computations may be done modulo a modulus m.

FIG. 1A schematically shows an example of an embodiment of a cryptographic system 100. System 100 comprises multiple network nodes. Shown are network nodes 140, 150 and 160. Of the multiple network nodes, a more detailed embodiment of network node 140 is shown. Network nodes 150 and 160 may use the same embodiment as network node 140. There may be two or more than three network nodes in system 100.

System 100 further comprises a certificate authority device 110. Certificate authority device 110 acts as trusted party for the multiple network nodes.

Network node 140 comprises a communication unit 142 and certificate authority device 110 comprises a communication unit 111. The communication units are arranged to communicate with each other. The communications units may communicate using wireless, or wired communication technology, or a combination thereof. The communications units may use digital communication. For example, example, communications unit 142 and 111 may be Wi-Fi and/or Ethernet communication units, etc. In embodiments, there is an accepted risk that the communication between network node 140 and 110 may be compromised by an attacker. An attacker may be able to eavesdrop on the communication between or even alter the communication.

Network node 140 comprises a key pair generation unit 141 arranged to generate a public key and a corresponding private key. The public key may be arranged for encryption according to an asymmetric-key cryptographic scheme. The corresponding private key is arranged for decryption according to the asymmetric-key cryptographic scheme. There are a number of public/private key schemes available that may be used. For example, the asymmetric-key cryptographic scheme may be RSA, or ElGamal, etc. Network node 140 comprises a decryption unit 143 arranged to decrypt messages using the private key. The public/private key may also be generated starting from, say, a device identifier stored in the device during manufacture.

Key pair generation unit 141 is arranged to randomly generate the key pair. For example, key pair generation unit 141 may comprise a random number generator arranged to generate a seed. The seed is used as a starting point to generate a random public and private key according to the particular asymmetric cryptography used. For example, if RSA is used, two random prime numbers may be selected based on the seed, the public and private key being generated from the prime numbers. For example, for ElGamal, the key pair generation unit 141 may select a random secret exponent x as part of the private key using the seed, and compute the exponent gx starting from that as part of the public key.

Communication unit 142 is arranged to receive from certificate authority device 110, local key material for an identity based key pre-distribution scheme, encrypted with the public key generated by key pair generation unit 141.

Decryption unit 143 is arranged to decrypt the encrypted local key material with the private key. Network node 140 comprises a key storage 144 arranged to store at least the local key material obtained by decryption unit 143. Key storage 144 may also store the private key of network node 140. Key storage 144 may be implemented, e.g., as a non-volatile memory, a magnetic storage etc. In an embodiment, key storage 144 is implemented as secure memory, e.g., tamper resistant memory.

The public key is sent to certificate authority device 110. In an embodiment, the public key will form the basis of the identity of network node 140. In addition to the public key, communication unit 142 of the network node may also send identifying information. The additional information may include, e.g., a name of a user, e.g., a device ID, e.g., a network address, say a MAC address or an IP address. The additional identifying information will be part of the certificate and may be visible to and authenticated by later users of the system. Network node 140 may send multiple public keys to certificate authority device 110 and thus obtain multiple certificates. This is advantageous for privacy reasons: network node 140 may use different identities that cannot be linked by other network nodes. Alternatively, network node 140 sends the same public key, but multiple additional informations to obtain multiple certificates. In yet another alternative, the certificate does not depend on the public key at all and network node 140 obtains one or more certificates based partly on additional information sent by network node 140, and/or partly based on further information included by the certificate authority device. This again is advantageous if privacy of network node 140 is important.

Network node 140 comprises a certificate storage 145 arranged to store the certificate. There are multiple ways in which network node 140 may obtain the certificate, see below.

Certificate authority device 110 comprises a certificate unit 112 arranged to generate a certificate for network node 140. It is advantageous, if the certificate comprises at least the public key received from network node 140, to prevent man in the middle attacks. The certificate may also comprise the additional identifying information received from network node 140. Certificate unit 112 may also add further information to the certificate. For example, certificate unit 112 may be arranged to include a certificate expiry date, a name of the certificate authority, etc, in the certificate. Thus, the certificate may have three types of information: a public key of network node 140, information received from network node 140, and information not-received from network node 140.

If the certificate authority device 110 does not add additional information, then network node 140 may be arranged to construct the certificate itself. This means that certificate authority device 110 does not need to send the certificate over to network node 140, thus saving bandwidth. On the other hand, certificate authority device 110 may be arranged to send the certificate constructed by certificate unit 112 to network node 140. Certificate authority device 110 may also save the certificate in a database or publish the certificate. Note that the certificate does not need to be signed. In an embodiment the certificate authority device may sign the certificate and/or include a certificate chain in the created certificate for additional security, but neither is necessary. Certificate unit 112 may use a digital structure to record the information, e.g. using a data structure language, such as XML or ASN.1.

Certificate authority device 110 comprises an identity unit 113 arranged to form an identifier by applying an identity forming function to the certificate. For example, the identity forming function may be a cryptographic hash function, e.g., SHA-1, SHA-2, RIPEMD, etc. The output of the hash function may be shortened if desired and acceptable given the number of public keys generated by the multiple nodes in system 100. The identifier identifies at least the public key. That is, given the identifier and all public keys used in the multiple nodes 140-160, the identifier corresponds to a unique public key.

Certificate authority device 110 comprises a key storage 114 and a local key material unit 115. The key storage 114 stores root key material for an identity-based key pre-distribution scheme. Several identity-based key pre-distribution schemes are possible, and are noted above. Local key material unit 115 is arranged to generate local key material specific for the network node by applying a local key material generation algorithm of the identity based key pre-distribution scheme on the root key material and the identifier.

A public key leads to a unique identifier which in turn leads to particular local key material linked to that identifier. Certificate authority device 110 comprises an encryption unit 116 arranged to encrypt at least the local key material specific for the network node by the public key of the network node. The encrypted local key material is sent to network node 140, e.g., using communication unit 111. If information was added to the certificate by certificate authority device 110, the certificate will also be sent to network node 140. Note that the certificate need not be signed by certificate authority device 110. Having certificate authority device 110 sign the certificate, e.g., using a public/private key signing system is not required. In an embodiment the certificate sent from certificate authority device 110 to network node 140 is not signed.

A certificate is authenticated by a certificate authority device by providing local key material. Instead of verifying a signature this implicit authentication can be verified by verifying that a party has local key material. The latter can be seen by verifying that the party can correctly compute a shared key. For example, network node 140 is authenticated implicitly by proving it has access to a shared key that is obtained from the certificate.

For example, suppose a first and second network node exchange certificates. The first and second network nodes respectively compute the second and first identifier from the certificates, and each computes the shared key. Next, suppose that the first network receives communication protected with the shared key which proves that the second network node has access to the shared key. The first network node can now reason as follows: since the second network node has access to the shared key, it must have local key material that corresponds to the second identifier in order to compute the shared key. The second network node can only receive local key material from the certificate authority, thus the certificate authority device has had access to the second identifier in order to compute the local key material. The certificate authority device computed the identifier from a certificate. As the identifiers match, the certificate for which the certificate authority device provided local key material, i.e., which the certificate authority device authenticated, is the same as the first network node received from the second network node.

Thus, if required, a network node can authenticate itself by proving knowledge of the local key material. As the latter is linked to the certificate, this implicitly authenticates the certificate as well. This system of distributing certificates will be further explained with reference to FIG. 2.

Cryptographic system 100 has several advantages.

Certificates need not be signed, thus the problem of long signatures on certificates is avoided. There are a number of circumstances in which this is particularly advantageous. For example, avoiding a signature implies that the certificates can be used in networks in which a lot of messages are exchanged, and/or in which overhead should be reduced. Especially in network with frequent and small messages such overhead is problematic. For example, such overhead may be problematic in a sensor network, or in the so-called Internet of things.

For example, if 2048 bit RSA keys are used, the signature and public key are each about 256 bytes long; eliminating the signature about halves the size of the certificate. Another particularly advantageous situation is in high security situations where care must be taken that the system is secure even in the presence of an attacker with access to a quantum computer. Although at present quantum computers have not evolved to the point where they can attack computer communication, it is known that most known signature algorithms would be vulnerable were the attack to be performed on a quantum computer. In signed certificates one could address this threat by using so-called Quantum safe signatures such as the Merkle signature scheme. However, Merkle signatures have several disadvantages, making them less suitable in practice. For example, the Merkle signature scheme is a one-time signature scheme with limited signing capacity. Moreover Merkle signatures tend to be very long. Thus, when security against quantum threats is required, the certificates according to an embodiment, which do not have a signature on the certificate, sidestep this issue.

For high security applications the security of a signature against non-quantum attacks could be combined with the security against quantum attacks by signing the certificate using a signing key (private) key of certificate authority device 110. For example, the certificate could be signed by RSA, ECDSA, etc.

Note that the absence of a signature on the certificate does not open the protocol to a man in the middle attack. Consider, a man in the middle between network node 140 and certificate authority device 110. Potentially, he could intercept a request of network node 140 for a certificate with the public key, and replace the public key with a public key of the man in the middle, for which he has the corresponding private key. Once the certificate and encrypted local key material comes back from the certificate authority, he could decrypt the local key material and save a copy, and swap the public key in the certificate back with the public key of network node 140. It would appear that the man in the middle has thus obtained a copy of the local key material, without the network node 140 or the certificate authority device 110 noting it. However, the local key material obtained in this way is useless to the man in the middle. Network node 140 is unable to agree on a key using the identity based key agreement scheme. Network node 140 uses the certificate to communicate his identity. As the identity is computed from the certificate, the other network node will arrive at a different identity than used by the certificate authority device when computing the local key material. The outcome of this is that the network node cannot communicate at all using the compromised key material.

In other words, even though the man in the middle may have an attack to get the local key material, it is a pyrrhic victory, since he cannot use it to attack communication of network node 140, because there will never be such communication. The inventors had the insight that it is advantageous to combine cryptographic system 100 with an identity-based key pre-distribution system with strong anti-collusion, such as a HIMMO based scheme. It is noted that an attack of the man in the middle which only eavesdrops without tampering with the communication will not work either since the local key material is encrypted using a public key for which he has no access to the private key.

In an embodiment, certificate unit 112 is arranged to generate a nonce and include the nonce in the certificate before forming the identifier. A nonce is a number used only once. For example, the nonce may be a random number, a time stamp, a serial number etc. As the nonce is used only once, no two certificates generated by certificate unit 112 are the same, even if all input information is the same. This has an advantage in case the attacker steals a public key and corresponding private key. In this case, he could try to apply for the certificate with the certificate authority device and hope to get a new copy of the local key material. If he were to succeed in this, previous communications obtained by the attacker and protected by the local key material could be compromised. However, if a nonce is included in the certificate, this will not work.

After the multiple network nodes, including nodes 140, 150 and 160 have been provisioned with a certificate and local key material, any two of them can agree on a shared key specific of that pair of network nodes.

Figure 2:
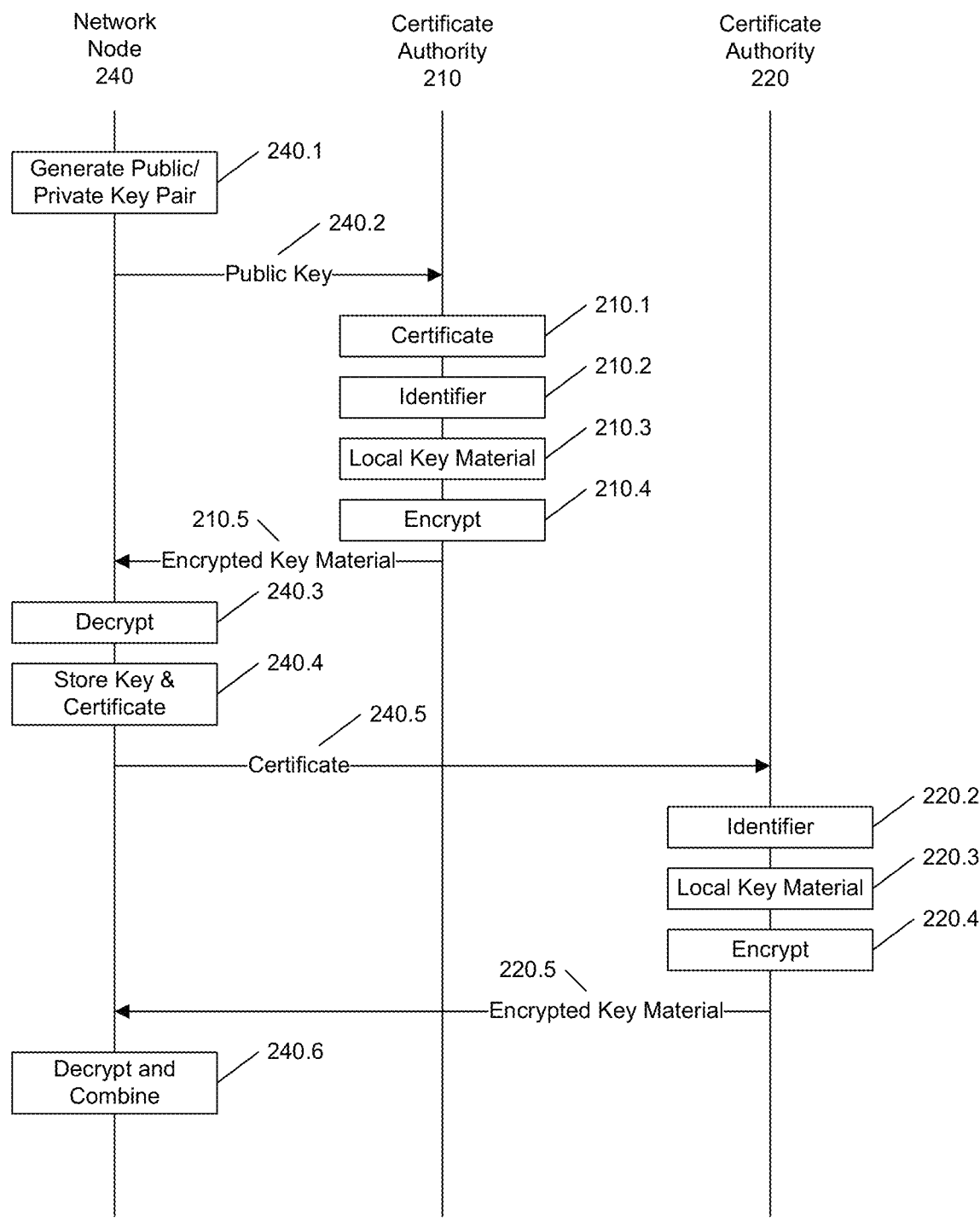

FIG. 2 shows in the form of a sequence diagram how a network node 240, e.g., network node 140 and a certificate authority device 210, e.g., certificate authority device 110 may cooperate to distribute a certificate. Time increases along the vertical axes from top to bottom of the figure. In the protocol usual protocol elements may be added if needed. For example, the messages in a particular protocol may include a session identifier, to identify the protocol session. Such session identifiers may be included in cryptographic elements as well, e.g., authentication tokens etc.

Network node 240 generates 240.1 a public key and a corresponding private key and sends 240.2 the public key to the certificate authority device 210. Certificate authority device 210 generates 210.1 a certificate comprising the public key, possibly a nonce, and possibly other information, and forms 210.2 an identifier by applying an identity forming function to the certificate. The identifier depends on the public key and the other information. Certificate authority device 210 then generates 210.3 local key material specific for the network node, by applying the local key material generation algorithm of the identity based key pre-distribution scheme on the root key material and the identifier. At least the local key material specific for the network node is encrypted 210.4 by the public key of the network node. In an embodiment, also the certificate is encrypted with the public key. Finally, the encrypted local key material is sent 210.5 to the network node. Optionally, the certificate is also sent to network node 240.

At the network node, the sent encrypted local key material is decrypted 240.3 using the private key, thus obtaining the local key material. The local key material, the private key, and the certificate are stored 240.4, e.g., in local storage, e.g., in a key storage and certificate storage.

In an embodiment, the protocol between network node 240 and certificate authority device 210 may now be finished. In an embodiment, further steps are done. For example, network node 240 and certificate authority device 210 may execute a challenge response protocol so that network node 240 and/or certificate authority device 210 can verify that network node 240 is correctly provisioned. For example, certificate authority device 210 and network node 240 may agree on a shared-key, e.g., using a shared key agreed with network node 240, e.g., using an embodiment of a key agreement protocol as described herein. To arrive at a shared key certificate authority device 240 may use a certificate and local key material generated for certificate authority device 240. For example, certificate authority device 240 may generate a certificate and local key material for itself, e.g., for this purpose, using his own root key material.

For example, network node 140 may select a nonce and send the nonce to certificate authority device 210. Certificate authority device 210 creates an authentication token from the nonce and the shared key, e.g., encrypts the nonce or computes a MAC over the nonce using the shared key, and sends the token back to network node 240. Network node 240 verifies the authentication toke with the share key and thus verifies that he is correctly provisioned.

This operation could also be performed with another network node instead of the certificate authority. The certificate authority device could perform a similar challenge response protocol in the opposite direction to verify that the network node is correctly provisioned.

For example, in an embodiment network node 240 and certificate authority device 210 may exchange the following messages.

1. From network node 240 to certificate authority device 210: a public key and a first nonce selected by network node 240.
2. From certificate authority device 210 to network node 240: local key material encrypted with the public key, a second nonce selected by certificate authority device 210, a network node certificate generated by certificate authority device 210 corresponding to the encrypted local key material, a certificate authority certificate, and a first authentication token computed over the first nonce (and possibly the second nonce) with a shared key obtained from the network node identifier and local key material of certificate authority device 210, and if needed helper data computed by certificate authority device 240.
3. From network node 240 to certificate authority device 210: a second authentication token computed over the second nonce (and possibly the first nonce). Note that the first and second authentication token should be computed differently, to avoid them being equal.

The latter step and the second nonce may be omitted if the certificate authority does not need to verify correct provisioning. Interestingly, the certificate authority certificate may be generated by the certificate authority device itself, for use with local key material which may also be generated by the certificate authority device itself. In an embodiment, the certificate authority certificate and its local key material may be generated for this purpose. For example, the certificate authority certificate may comprise freshness data, such as the first nonce. The latter confirms for the network node that the entire key agreement is fresh. For example, the certificate authority certificate may comprise a name of the certificate authority. The certificate authority certificate need not comprise a public key.

Message 240.2 may be a certificate request comprising the public key and information. If the public key has a dual use as signing key (e.g., combining RSA encryption and signing or ElGamal encryption and ECDSA signing) then the request may be signed by the private key corresponding to the public key. This signature is verified by the certificate authority. The request may be accompanied by other credentials or proofs of identity if required by the certificate authority.

Another extension of the protocol up to 240.4 is to use multiple certificate authorities. FIG. 2 shows a further certificate authority device 220. Network node 240 may be arranged to send the certificate to further certificate authority 220. For example, network node 240 either constructs the certificate itself, or receives the certificate from certificate authority device 210. The certificate for which it has received local key material and which defines its identity is then send to further certificate authority 220 by network node 240. Alternatively, further certificate authority 220 may receive the certificate from certificate authority device 210.

Further certificate authority 220 may comprise
- a communication unit arranged to receive the certificate, e.g., from network node 240 or certificate authority device 210.
- an identity unit 113 arranged to form the identifier of network node 240 by applying an identity forming function to the certificate.
- a key storage 114 for storing root key material for an identity-based key pre-distribution scheme. Certificate authorities 210 and 220 use the same identity-based key pre-distribution scheme, but the root key material of certificate authorities 210 and 220 is different but compatible so that local key material generated by certificate authorities 210 and 220 may be combined by network node 240.

a local key material unit 115 arranged to generate further local key material specific for network node 240 by applying the local key material generation algorithm of the identity based key pre-distribution scheme on the root key material of further certificate authority 220 and the identifier of network node 240.

Further certificate authority 220 may comprise an encryption unit arranged to encrypt at least the further local key material specific for the network node 240, e.g., by the public key of the network node. The encryption unit may instead or in addition encrypt the further local key material using a shared key agreed with network node 340, e.g., using an embodiment of a key agreement protocol as described herein.

Further certificate authority 220 may be arranged to send the generated local key material to network node 240. The network node 240 thus obtains further local key material.

Network node 240 may combine the local key material received from the certificate authority device and the further local key material received from the further certificate authority device into a single local key material. The combination may be done after receiving the local key materials, e.g., by adding the local key materials, to obtain a combined local key material. The combined local key material may be used for key agreement. The combination does not need to be done directly after receiving the information, although this is possible.

Waiting with combining key material until needed in a key agreement has the advantage that the network nodes can engage in TTP (certificate authority) negotiation. Identity-based key pre-distribution schemes based on HIMMO are particularly advantageous for this embodiment, since in HIMMO local key materials can be combined straightforwardly by a modular addition. In an embodiment, two network nodes communicate to each other which certificate authorities they support, e.g., in a hello message at the start of the protocol. The generated key between these nodes then is based on the local keying material generated by the certification authorities supported by both network nodes. In this case, local keying material of multiple certificate authority devices is stored.

Figure 1B:
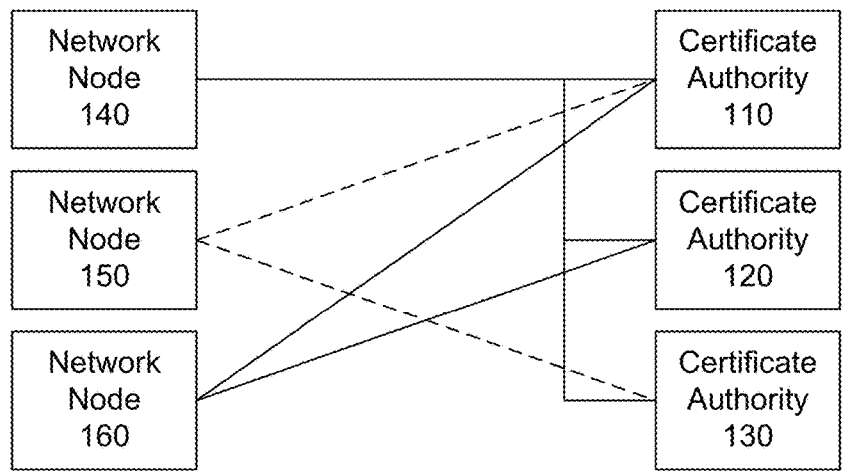

FIG. 2 shows the following optional additional steps, corresponding to this embodiment. Network node sends 240.5 the certificate to a further certificate authority device 220. Further certificate authority device 220, forms 220.2 an identifier by applying an identity forming function to the certificate, generate 220.3 local key material specific for the network node, encrypt 220.4 at least the local key material specific for the network node by the public key of the network node, and sends 220.5 the encrypted local key material to the network node. Network node 240 may combine the local key material received from the certificate authority device and the further certificate authority device FIG. 1B schematically shows an embodiment of cryptographic system 101 using multiple certificate authorities, shown are 110, 120 and 130, and multiple network nodes, shown are 140, 150, and 160. All network nodes receive local key material from at least two different certificate authorities. Optionally, some network nodes may receive local key material from more certificate authorities than another node. The latter option is illustrated in FIG. 1B.

Network node 140 receives local key material from certificate authorities 110, 120 and 130. Network node 150 receives local key material from certificate authorities 110, and 130. Network node 160 receives local key material from certificate authorities 110, and 120.

Receiving local key material from multiple certificate authorities makes the system more resilient to attack on the certificate authority. Even if a certificate authority device is compromised then still the system is secure, since all network nodes have local key material from at least one further certificate authority. An example of combining multiple local key materials for HIMMO is given in PCT/EP2015/069384 of the same applicant, and incorporated by reference.

In conventional certificate authorities it is hard to certify by more than or a few certificate authorities. However, with certificates according to an embodiment combining certification of multiple certificate authorities is not a problem. For example, in an embodiment, more than two, say 50 certificate authorities are combined. For example, every mobile phone operator may operate a certificate authority. The network node uses a first certificate authority device to get a certificate and first local key material. Next the network node sends the certificate to 49 more certificate authorities and receives 49 times additional local key materials. Once a network node has received local key material, encryption and/or authentication may also be done using a shared key instead or in addition to the public key. In an embodiment, all local key material is encrypted with the public key of the network node in transit and/or with a shared key. By using at least the public key of the network node, even if the first certificate authority is compromised the network node will receive uncompromised key materials from uncompromised subsequent certificate authorities.

Figure 3A:
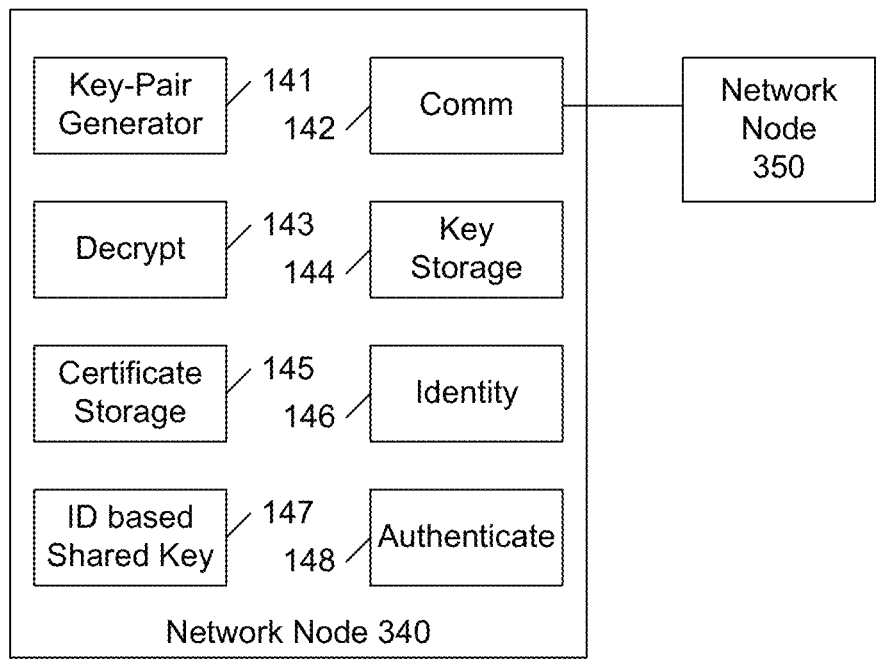
Figure 3B:
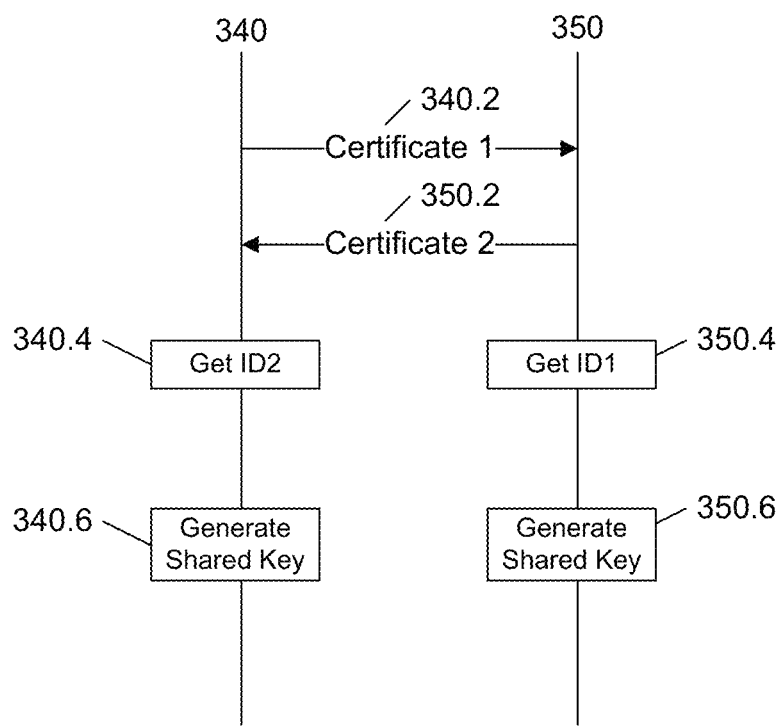

FIGS. 3A and 3B illustrates one option how the system may be operated to perform key agreement. FIG. 3A shows a first network node 340 and a second network node 350. These network nodes may be embodiments of the network nodes 140 and 150. First and second network nodes 340 and 350 have been provisioned by a certificate authority device with a first and second certificate and first and second local key material, respectively. The network nodes 340 and 350 have additional hardware or software to implement a key agreement protocol. Network node 340 is shown in more detail. Network node 350 may also use an embodiment, e.g., of the same design as network node 340.

Network node 340 further comprises an identity unit 146. Identity unit 146 is capable of computing the identifier that corresponds to a certificate. Identity unit 146 may be the same as the identity unit 113 of certificate authority device 110. All participants in the system, network nodes and certificate authority(ies) are capable of computing the same identifiers. For example, the identity forming function applied to the certificate may be keyed, e.g., a keyed hash, e.g., a MAC, HMAC etc, but in this case all participants in the system have access to the same key used in the identity forming function. This limits participation in the system to devices that have access to the key. Such a key may be provided in network nodes during manufacture.

The certificate storage 145 of network node 340 stores the certificate, e.g., received from the certificate authority, which is referred to in the context of FIGS. 3A and 3B as the first certificate. Network node 340 further comprises an identity-based shared key unit 147. Network node 340 is arranged to obtain a second certificate from second network node 350 through the communication unit. Identity unit 146 is arranged to obtain a second identity from the second certificate by applying the identity forming function to the second certificate. Note that the second identifier is the same identifier that was used by the certificate authority device to generate the local key material of second network node 350.

Network node 340 comprises an identity-based shared key unit 147 arranged for a key establishment algorithm that corresponds to the same identity-based key pre-distribution scheme as used by the certificate authority. Shared key unit 147 is arranged to generate an identity-based shared key by applying a key establishment algorithm of the identity based key pre-distribution scheme on the second identity and the first local key material ($K_{1B} = G_A(ID_B)$).

After the shared key has been generated, it can be used to protect communication between network nodes 340 and 350. For example, the shared key may be used to authenticate or integrity protect messages by computing a MAC over a message using the shared key. For example, the shared key may be used to protect confidentiality by encrypting the message using the shared key. Before the shared key is used, a key derivation may be applied to secure the link with the identity based algorithm, and/or, a key diversify algorithm may be applied to generate multiple keys, e.g., a MAC and a different encrypt key from the same shared key.

In an embodiment, the network node 340 comprises an authentication unit 148 arranged to
  compute a first authentication token from at least the identity-based shared key, and to send it to the second network node, and/or
  verify a second authentication token received from the second network node from at least the identity-based shared key.

For example, in an embodiment authentication unit 148 may both verify and compute an authentication token, for two way authentication. However, this is not always required. For example, some client-server relationships may only require that the client authenticate the server, or vice versa.

FIG. 3B shows a sequence diagram with a possible embodiment of a protocol between network nodes 340 and 350. For example, first network node 340 may send 340.2 the first certificate to the second network node, and second network node 350 may send 350.2 the second certificate to the first network node.

First network node obtains 340.4 the second identity from the second certificate by applying the identity forming function, and generate 340.6 the identity-based shared key from the second identity and the first local key material.

Second network node obtains 350.4 the first identity from the first certificate by applying the identity forming function, and generate 350.6 the identity-based shared key from the first identity and the second local key material.

If the identity-based key pre-distribution scheme uses helper data to guide the forming of the shared key (e.g. as is done in some embodiments of HIMMO), then the helper data may be computed by any network node, but preferably, second network node 350. Second network node 350 is the first to have access to the identity of the other party (in this case through the first certificate). Second network node 350 may send the helper data to network node 340 together with the helper data.

Any one or both of network nodes 340 and 350 may further compute an authentication token. For example, a MAC or HMAC using the shared key over a nonce received from the other party, or timestamp, etc. A party receiving the authentication token can verify the token using the shared key. For example, both network nodes 340 and 350 may send a nonce together with the certificate.

For example, in an embodiment, network node 340 and network node 350 may exchange the following messages
 1. From network node 340 to network node 350: Certificate of network node 340, and a first nonce
 2. From network node 350 to network node 340: Certificate of network node 350, a second nonce, an authentication token over at least the first nonce and the shared key, and if needed helper data.
 3. From network node 340 to network node 350: an authentication token over at least the second nonce In an embodiment, a further certificate authority device first performs a key agreement according to an embodiment, including verifying an authentication token, using its own local key material and certificate, e.g., generated by itself or a different certificate authority.

In embodiments described above the certificate authority device 110 comprises the certificate unit 112 arranged to generate a certificate comprising the public key, and the identity unit 113 arranged to form an identifier by applying an identity forming function to the certificate. This has the advantage that the certificate authority device 110 can verify itself that the identifier really corresponds to the certificate. This is not necessary though, in an embodiment the certificate unit and the identity unit are comprised in the network node. The network node sends to the certificate authority device the public key and the identifier. This is sufficient information for the certificate authority device to create local key material linked to the certificate through the identifier, and to protect the local key material during transport using the public key. An advantage of the latter is that bandwidth is reduced during certificate creation, as no certificate is sent to or from the certificate authority. The latter may also be used when obtaining multiple local key materials, e.g., by sending the identifier and public key to one or more further certificate authorities, rather than sending the certificate to the further certificate authority. In an embodiment, the initial certificate may be received from the first certificate authority, whereas a further certificate authority only receives the identifier and the public key, and not necessarily the full certificate.

In an embodiment, the first network node comprises an identity unit (146) arranged to form an identifier by applying the identity forming function to a certificate, a communication unit (142) arranged to obtain a second certificate from a second network node, the identity unit being arranged to obtain a second identity from the second certificate, an identity-based shared key unit (147) arranged to generate an identity-based shared key by applying a key establishment algorithm of the identity based key pre-distribution scheme on the second identity and the first local key material, and an authentication unit (148) arranged to compute a first authentication token from at least the identity-based shared key, and to send it to the second network node, and/or verify a second authentication token received from the second network node from at least the identity-based shared key.

The local key material used by the first network node may be obtained from a single certificate authority, or from multiple certificate authorities and combined before the network node starts the above protocol. This is not necessary though, the network node may also select which local key material to use during the protocol. For example, in an embodiment the communication node is arranged to send to the second network node from which certificate authorities the first network node received local key material, and to receive from the second network node from which certificate authorities the second network node received local key material, the identity-based shared key unit being arranged to combine local keying material generated by the certification authorities for which both the first and second network nodes received local key material, e.g., to combine local keying material for all common certificate authorities.

Certificate authority agreement has an advantage as can be seen in the following example. Suppose, the first network node received local keying material from certificate authorities CA1 and CA2, and the second network node from certificate authorities CA2, and CA3. The two network nodes can communicate together using only the keying material from CA2. They cannot communicate with each other if the first network node had combined the material of CA1 and CA2, whereas the second network node combined the material of CA2 and CA3. The reduce a possible risk of manipulating a network node into using a weak certificate authority, a network node could require that local keying material from at least two common certificate authorities are needed to communicate.

Further protocols for using the local key material and/or certificates are provided in a patent application with title "handshake protocols for identity-based key material and certificates", which has the same inventors, and applicants as the present patent application and is filed on the same date with the same office; the patent is incorporated herein by reference.

Typically, the network nodes and certificate authorities each comprise a microprocessor (not separately shown) which executes appropriate software stored at the network node and certificate authority; for example, that software may have been downloaded and/or stored in a corresponding memory, e.g., a volatile memory such as RAM or a non-volatile memory such as Flash (not separately shown). Alternatively, the network nodes and certificate authorities may, in whole or in part, be implemented in programmable logic, e.g., as field-programmable gate array (FPGA). The network nodes and certificate authorities may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, a network node may comprise one or more of a key pair generation circuit, a communication circuit, a decryption circuit, a key storage circuit, a certificate storage, an identity circuit, a shared key circuit, and an authentication circuit. A certificate authority device may comprise one or more of a communication circuit, a certificate circuit, an identity circuit, a key storage circuit, a local key material circuit, and an encryption circuit. The circuits may be a processor circuit and storage circuit, the processor circuit executing instructions represented electronically in the storage circuits. The circuits may also be FPGA, ASIC or the like.

Embodiments of network node methods, and certificate authority methods, e.g., as shown in FIGS. 2 and 3B may be executed in many ways, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps may be executed, at least partially, in parallel. Moreover, a given step may not have finished completely before a next step is started.

A method according to the invention may be executed using software, which comprises instructions for causing a processor system to perform method according to an embodiment. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 4A:
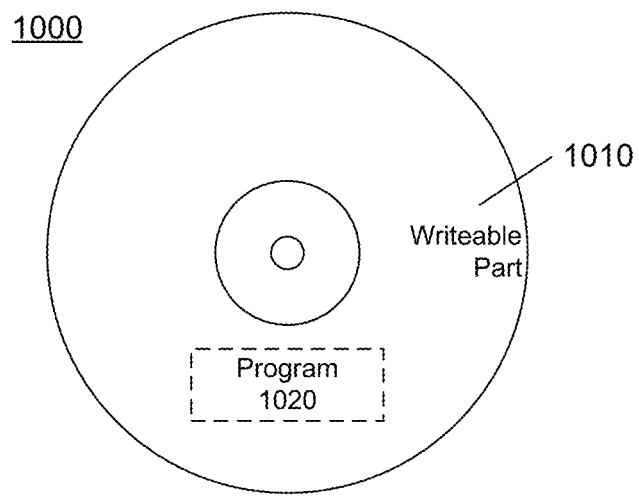

FIG. 4A shows a computer readable medium 1000 having a writable part 1010 comprising a computer program 1020, the computer program 1020 comprising instructions for causing a processor system to perform a network node method and/or certificate authority method according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform a network node method and/or certificate authority method according to an embodiment. The certificate, public key, nonces, and authentication token, etc, are digital data.

Figure 4B:
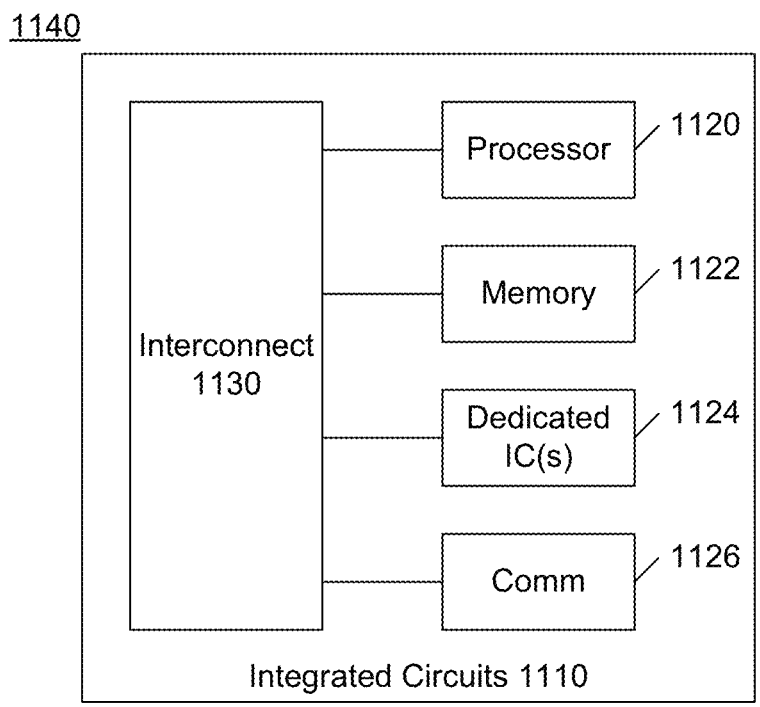

FIG. 4B shows in a schematic representation of a processor system 1140 according to an embodiment. The processor system comprises one or more integrated circuits 1110. The architecture of the one or more integrated circuits 1110 is schematically shown in FIG. 4B. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

LIST OF REFERENCE NUMERALS IN FIGS. 1A AND 3B 100 a cryptographic system
110, 120, 130 certificate authority device
111 a communication unit
112 a certificate unit
113 an identity unit
114 a key storage
115 a local key material unit
116 an encryption unit
140, 150, 160 a network node
141 a key pair generation unit
142 a communication unit
143 a decryption unit
144 a key storage
145 a certificate storage
146 an identity unit
147 a shared key unit
148 an authentication unit
210 certificate authority device
220 further certificate authority device
240 a network node
340 a first network node
350 second network node
240.1 generate a public key and a corresponding private key
240.2 send the public key to the certificate authority device
240.3 decrypt the sent encrypted local key material using the private key obtaining the local key material,
240.4 store at least the local key material, the private key, the certificate.
240.5 send the certificate to a further certificate authority device
240.6 combine the local key material received from the certificate authority device and the further certificate authority device
210.1 generate a certificate comprising the public key,
210.2 form an identifier by applying an identity forming function to the certificate,
210.3 generate local key material specific for the network node
210.4 encrypt at least the local key material specific for the network node by the public key of the network node,
210.5 send the encrypted local key material to the network node,
220.2 form an identifier by applying an identity forming function to the certificate,
220.3 generate local key material specific for the network node
220.4 encrypt at least the local key material specific for the network node by the public key of the network node,
220.5 send the encrypted local key material to the network node,
340.2 send the first certificate to the second network node
350.2 send the second certificate to the first network node
340.4 obtain a second identity from the second certificate
340.6 generate the identity-based shared key from the second identity and the first local key material
350.4 obtain a first identity from the first certificate
350.6 generate an identity-based shared key from the first identity and the second local key material.

The invention claimed is:

1. A cryptographic system for distributing certificates comprising a certificate authority device and multiple network nodes,
a network node of the multiple network nodes comprising:
a key pair generation circuit that generates a public key and a corresponding private key,
wherein the public key is arranged for encryption according to an asymmetric-key cryptographic scheme,
wherein the private key is arranged for decryption according to the asymmetric-key cryptographic scheme,
a first communication circuit,
wherein the first communication circuit sends the public key to the certificate authority device,
the certificate authority device comprising:
a second communication circuit,
wherein the second communication circuit receives the public key from the network node,
a key storage,
wherein the key storage stores root key material for an identity-based key pre-distribution scheme,
wherein at least one of the certificate authority device and at least one network node comprises:
a certificate circuit,
wherein the certificate circuit generates a certificate for the network node, and
an identity circuit,
wherein the identity circuit forms an identifier by applying an identity forming function to the certificate,
wherein the identity forming function comprises a cryptographic hash function,
the certificate authority device further comprising:
a local key material circuit,
wherein the local key material circuit generates local key material specific for the network node by applying a local key material generation algorithm of the identity-based key pre-distribution scheme on the root key material and the identifier, and
an encryption circuit,
wherein the encryption circuit encrypts at least the local key material specific for the network node by the public key of the network node,
wherein the second communication circuit sends the encrypted local key material to the network node,
the network node further comprising:
a decryption circuit,
wherein the decryption circuit decrypts the sent encrypted local key material using the private key obtaining the local key material, a local key storage,
   wherein the local key storage stores at least the local key material and the private key, and
a certificate storage,
   wherein the certificate storage stores the certificate;
wherein the network node selects a nonce,
wherein the first communication circuit sends the nonce to the certificate authority device,
wherein the certificate authority device obtains a certificate authority certificate and certificate authority local key material
wherein the certificate authority local key material is generated for an identifier obtained from the certificate authority certificate by the identity circuit,
wherein the certificate authority device generates a shared key from the network node identifier and the certificate authority local key material,
wherein the certificate authority device computes an authentication token from the nonce and the shared key,
wherein the second communication circuit sends the certificate authority certificate and the authentication token to the network node, and
wherein the network node generates the shared key from the certificate authority certificate and the local key material of the network node to verify the authentication token.

2. The cryptographic system as in claim 1, wherein the certificate comprises the public key and wherein the identifier identifies at least the public key.

3. The cryptographic system as in claim 1,
wherein the first communication circuit of the network node sends identifying information in addition to the public key to the certificate authority device, and
wherein the certificate circuit includes the identifying information in the certificate.

4. The cryptographic system as in claim 1, wherein the certificate authority device comprises the certificate circuit,
wherein the certificate circuit generates a certificate comprising the public key and
wherein the identity circuit forms the identifier by applying an identity forming function to the certificate.

5. The cryptographic system as in claim 4, wherein the certificate circuit includes further information in the certificate before forming the identifier.

6. The cryptographic system as in claim 4,
wherein the certificate circuit generates a second nonce and
wherein the certificate circuit includes the second nonce in the certificate before forming the identifier.

7. The cryptographic system as in claim 4,
wherein the first communication circuit sends the certificate to a further certificate authority device,
wherein the first communication circuit receives further local key material from the further certificate authority device, and
wherein the network node combines the local key material received from the certificate authority device and the further local key material received from the further certificate authority device into a single local key material.

8. The cryptographic system as in claim 1, wherein the certificate is not signed.

9. The cryptographic system as in claim 1, wherein the first network node comprises:
the identity circuit,
   wherein the identity circuit forms an identifier by applying the identity forming function to a certificate,
   wherein the first communication circuit obtains a second certificate from a second network node,
   wherein the identity circuit obtains a second identity from the second certificate,
an identity-based shared key circuit,
   wherein the identity-based shared key circuit generates an identity-based shared key by applying a key establishment algorithm of the identity-based key pre-distribution scheme on the second identity and the first local key material.

10. The cryptographic system as in claim 9,
wherein the network node comprises an authentication circuit,
wherein the authentication circuit computes a first authentication token from at least the identity-based shared key, and
   wherein the authentication circuit sends the first authentication token to the second network node, and/or
   wherein the authentication circuit verifies a second authentication token received from the second network node from at least the identity-based shared key.

11. The cryptographic system as in claim 1, wherein the identity-based key pre-distribution scheme is a Hiding Information-Mixing Modular Operations (HIMMO) scheme.

12. A network node, the network node comprising:
a key pair generation circuit,
   wherein the key pair generation circuit generates a public key and a corresponding private key,
   wherein the public key is arranged for encryption according to an asymmetric-key cryptographic scheme,
   wherein the private key is arranged for decryption according to the asymmetric-key cryptographic scheme,
a communication circuit,
   wherein the communication circuit sends the public key to a certificate authority device,
   wherein the communication circuit receives a certificate and encrypted local key material,
   wherein the network node has an identifier that is generated by applying an identity forming function to the certificate,
   wherein the identity forming function comprises a cryptographic hash function,
   wherein the local key material is generated by applying a local key material generation algorithm of an identity-based key pre-distribution scheme on root key material and the identifier of the network node,
a decryption circuit,
   wherein the decryption circuit decrypts the received encrypted local key material using the private key to obtain the local key material,
a key storage,
   wherein the key storage stores the local key material and the private key, and
a certificate storage,
   wherein the certificate storage stores the certificate;
wherein the network node selects a nonce,
wherein the communication circuit sends the nonce to a certificate authority device, wherein the communication circuit receives a certificate authority certificate and an authentication token from the certificate authority device,
wherein the authentication token is based on the nonce and a shared key,
wherein the shared key is based on the identifier of the network node,
wherein the network node generates the shared key from the certificate authority certificate and local key material of the network node, and
wherein the network node verifies the authentication token based on the generated shared key.

13. A certificate authority device comprising:
a communication circuit,
    wherein the communication circuit receives a public key from a network node,
a key storage,
    wherein the key storage stores root key material for an identity: based key pre-distribution scheme,
a local key material circuit,
    wherein the local key material circuit generates local key material specific for the network node by applying a local key material generation algorithm of the identity-based key pre-distribution scheme on the root key material and an identifier of the local node,
    wherein the identifier is obtained by applying an identity forming function to a certificate of the network node,
    wherein the identity forming function comprises a cryptographic hash function, and
an encryption circuit,
    wherein the encryption circuit encrypts at least the local key material specific for the network node by the public key of the network node,
wherein the communication circuit sends the encrypted local key material to the network node;
wherein the communication circuit receives a nonce from the network node,
wherein the certificate authority device obtains a certificate authority certificate and certificate authority local key material generated for an identifier obtained from the certificate authority certificate by an identity circuit,
wherein the certificate authority device generates a shared key from the network node identifier and the certificate authority local key material,
wherein the certificate authority device computes an authentication token from the nonce and the shared key, and
wherein the communication circuit of the certificate authority device sends the certificate authority certificate and authentication token to the network node for verification by the network node.

14. A network node method, the network node method comprising:
generating a public key and a corresponding private key,
    wherein the public key is arranged for encryption according to an asymmetric-key cryptographic scheme,
    wherein the private key is arranged for decryption according to the asymmetric-key cryptographic scheme,
sending the public key to a certificate authority device
receiving a certificate and encrypted local key material,
    wherein the network node has an identifier obtainable by applying an identity forming function to the certificate,
    wherein the identity forming function comprises a cryptographic hash function,
    wherein the local key material is generated by applying a local key material generation algorithm of an identity-based key pre-distribution scheme on root key material and the first identifier,
decrypting the received encrypted local key material using the private key to obtain the local key material,
storing the local key material, the private key, and the certificate,
selecting a nonce,
sending the nonce to the certificate authority device,
receiving a certificate authority certificate and an authentication token from the certificate authority device,
    wherein the authentication token is based on the nonce and a shared key,
    wherein the shared key is based on the identifier of the network node,
generating the shared key from the certificate authority certificate and local key material of the network node, and
verifying the authentication token based on the generated shared key.

15. A certificate authority method, the certificate authority method comprising
receiving a public key from a network node,
generating local key material specific for the network node by applying a local key material generation algorithm of the identity-based key pre-distribution scheme on root key material and an identifier,
    wherein the root key material is arranged for an identity: based key pre-distribution scheme,
    wherein the identifier is obtained by applying an identity forming function to a certificate of the network node,
    wherein the identity forming function comprises a cryptographic hash function,
encrypting at least the local key material specific for the network node by the public key of the network node,
sending the encrypted local key material to the network node
receiving a nonce from the network node,
obtaining a certificate authority certificate and certificate authority local key material generated for an identifier obtained from the certificate authority certificate by an identity circuit,
generating a shared key from the network node identifier and the certificate authority local key material,
computing an authentication token from the nonce and the shared key, and
sending the certificate authority certificate and authentication token to the network node for verification by the network node.

* * * * *